United States Patent
Mervant et al.

(10) Patent No.: US 10,458,246 B2
(45) Date of Patent: Oct. 29, 2019

(54) OPTIMIZED AERODYNAMIC PROFILE FOR A TURBINE VANE, IN PARTICULAR FOR A NOZZLE OF THE FIFTH STAGE OF A TURBINE

(71) Applicant: SAFRAN AIRCRAFT ENGINES, Paris (FR)

(72) Inventors: Thomas Michel Mervant, Paris (FR); Erwan Daniel Botrel, Alfortville (FR); Maxime Didier Delabriere, Maisons-Alfort (FR); Jean-Armand Marc Destouches, Savigny-le-Temple (FR)

(73) Assignee: Safran Aircraft Engines, Paris (FR)

( * ) Notice: Subject to any disclaimer, the term of this patent is extended or adjusted under 35 U.S.C. 154(b) by 498 days.

(21) Appl. No.: 15/393,470

(22) Filed: Dec. 29, 2016

(65) Prior Publication Data
US 2018/0230807 A1    Aug. 16, 2018

Related U.S. Application Data

(60) Provisional application No. 62/361,551, filed on Jul. 13, 2016.

(51) Int. Cl.
*F01D 5/14* (2006.01)
*F01D 9/04* (2006.01)

(52) U.S. Cl.
CPC ............ *F01D 5/142* (2013.01); *F01D 5/141* (2013.01); *F01D 9/041* (2013.01); *F01D 9/047* (2013.01); *F05D 2220/323* (2013.01); *F05D 2220/3218* (2013.01); *F05D 2240/128* (2013.01); *F05D 2250/74* (2013.01); *Y02T 50/673* (2013.01)

(58) Field of Classification Search
CPC .......... F01D 5/142; F01D 9/041; F01D 5/141; F01D 9/047; Y02T 50/673; F05D 2220/3218; F05D 2250/74; F05D 2240/128; F05D 2220/323
See application file for complete search history.

(56) References Cited

U.S. PATENT DOCUMENTS

| | | | |
|---|---|---|---|
| 2012/0051895 A1* | 3/2012 | Guimbard | F01D 5/141 415/191 |
| 2018/0016904 A1* | 1/2018 | Mervant | F01D 5/141 |
| 2018/0016905 A1* | 1/2018 | Marche | F01D 5/141 |
| 2018/0016906 A1* | 1/2018 | Delabriere | F01D 5/141 |
| 2018/0016925 A1* | 1/2018 | Man | F01D 9/041 |
| 2018/0230808 A1* | 8/2018 | Routier | F01D 5/142 |
| 2018/0230809 A1* | 8/2018 | Routier | F01D 5/142 |

(Continued)

*Primary Examiner* — Jacob M Amick
*Assistant Examiner* — Charles Brauch
(74) *Attorney, Agent, or Firm* — Bookoff McAndrews, PLLC

(57) ABSTRACT

When cold and in the non-coated state, the aerodynamic profile is substantially identical to a nominal profile determined by the Cartesian coordinates X,Y, Zadim given in Table 1, in which the coordinate Zadim is the quotient D/H where D is the distance of the point under consideration from a first reference plane P0 situated at the base of the nominal profile, and H is the height of said profile measured from the first reference plane to a second reference plane P1. The measurements D and H are taken radially relative to the axis of the turbine, while the X coordinate is measured in the axial direction of the turbine.

11 Claims, 2 Drawing Sheets

(56) References Cited

U.S. PATENT DOCUMENTS

2018/0328200 A1* 11/2018 Routier ............... F01D 9/041
2018/0328202 A1* 11/2018 Scholl ................ F01D 9/041
2018/0328204 A1* 11/2018 Scholl ................ F01D 9/041
2018/0328205 A1* 11/2018 Pintat ................ F01D 9/041
2018/0328206 A1* 11/2018 Delabriere ........... F01D 9/041

* cited by examiner

OPTIMIZED AERODYNAMIC PROFILE FOR A TURBINE VANE, IN PARTICULAR FOR A NOZZLE OF THE FIFTH STAGE OF A TURBINE

CROSS-REFERENCE TO RELATED APPLICATION(S)

This patent application claims the benefit under 35 U.S.C. § 119 to U.S. Provisional Application No. 62/361,551, filed on Jul. 13, 2016, the entirety of which is incorporated herein by reference.

FIELD OF THE DISCLOSURE

The present invention relates to an aerodynamic profile for a turbine vane.

Introduction

In particular, the invention relates to the aerodynamic profile of a nozzle vane forming a portion of the stator of a gas turbine, and more particularly of a low pressure turbine of the type used in a turbojet of an aircraft.

The invention relates in particular to a nozzle vane of the fifth stage of a turbine having a plurality of stages, preferably seven stages.

Such a profile should enable the turbine to provide the desired efficiency, and in order to do that it must be such that the flow of air around the profile is sound over the working spectrum of the turbine, i.e. substantially such that it does not give rise to turbulence, which is harmful for overall efficiency.

It must be capable of being installed properly in the environment of the engine, and in particular, for a nozzle vane forming a portion of the stator of the turbine, it must be capable of being fastened easily to the sectors of the foot platform (the zone of the vane that is furthest from the axis of rotation of the turbine) and of the head platform (the zone that is closest to said axis). Furthermore, this part must present a profile enabling it to be manufactured in a reliable and cost-effective manner by available manufacturing methods, such as casting, forging, machining, additive fabrication, or else weaving, without this list being limitative.

Furthermore, the profile of the vane must enable it to withstand the mechanical stresses, to which the vane is subjected, by enabling those stresses to be spread over the entire vane in such a manner as to avoid premature wear thereof. This spreading must apply both in static mode and in dynamic mode.

An object of the invention is to propose an aerodynamic profile for a turbine vane that is optimized, and capable of satisfying those objectives.

This object is achieved by the fact that when cold and in a non-coated state, said profile is substantially identical to a nominal profile determined by the Cartesian coordinates X,Y,Zadim given in Table 1, in which the coordinate Zadim is the quotient D/H where D is the distance of the point P under consideration from a reference X,Y plane situated at the base of the nominal profile, and H is the height of said profile measured from said reference plane that is the intersection of the stacking axis of the set of vanes and the axisymmetric surface of the hub, out to a second reference plane that is the intersection of said stacking axis with the axisymmetric surface of the casing, the measurements D and H being taken radially relative to the axis of the turbine, while the coordinate X is measured in the axial direction of the turbine.

This profile has been determined as a result of numerous tests and simulations. It is defined cold, i.e. at an ambient temperature of 20° C. That is a reference temperature at which the profile is geometrically determined. The above-mentioned objectives of aerodynamics and mechanical optimization are naturally valid for the conditions of use of this aerodynamic profile, i.e. when hot, at a temperature that is stabilized when the engine of which the turbine forms a part is being used under cruising conditions.

Furthermore, the aerodynamic profile of the invention is defined in the non-coated state. Since turbine vanes are subjected to high temperature gradients, it is common practice for them to be provided with a coating having thermal properties enabling them more easily to withstand such temperature variations. The profile is determined prior to installing such a coating.

It is stated above that the profile of the invention is "substantially identical" to the nominal profile. This means that the profile may depart very slightly from said nominal profile.

The aerodynamic profile is thus preferably defined within an envelope of ±1 millimeter (mm) in a direction normal to the surface of the nominal profile.

This variation takes account in particular of manufacturing tolerances of the profile.

It is also preferable for the X,Y coordinates of the aerodynamic profile to lie within a range of ±5% relative to the X,Y coordinates of the nominal profile.

This variation takes account of the setting of the profile to adapt to the flow coming from the blades of the turbine situated upstream, so as to further improve the efficiency of the turbine. In particular, the profile is adapted so as to be optimized for the flow coming from the rotary wheel of the fourth stage of a turbine when the vane of the invention belongs to the nozzle of the fifth stage of a turbine.

With a nozzle vane, i.e. a portion of the stator of a turbine, the profile serves to orient the fluid correctly for the turbine blades that are situated downstream, and that belong in particular to the rotary wheel of the fifth stage of the turbine.

BRIEF DESCRIPTION OF THE DRAWINGS

The invention can be better understood and its advantages appear better on reading the following detailed description of an embodiment given by way of non-limiting example. The description refers to the accompanying drawings, in which.

DETAILED DESCRIPTION

Figure 1:
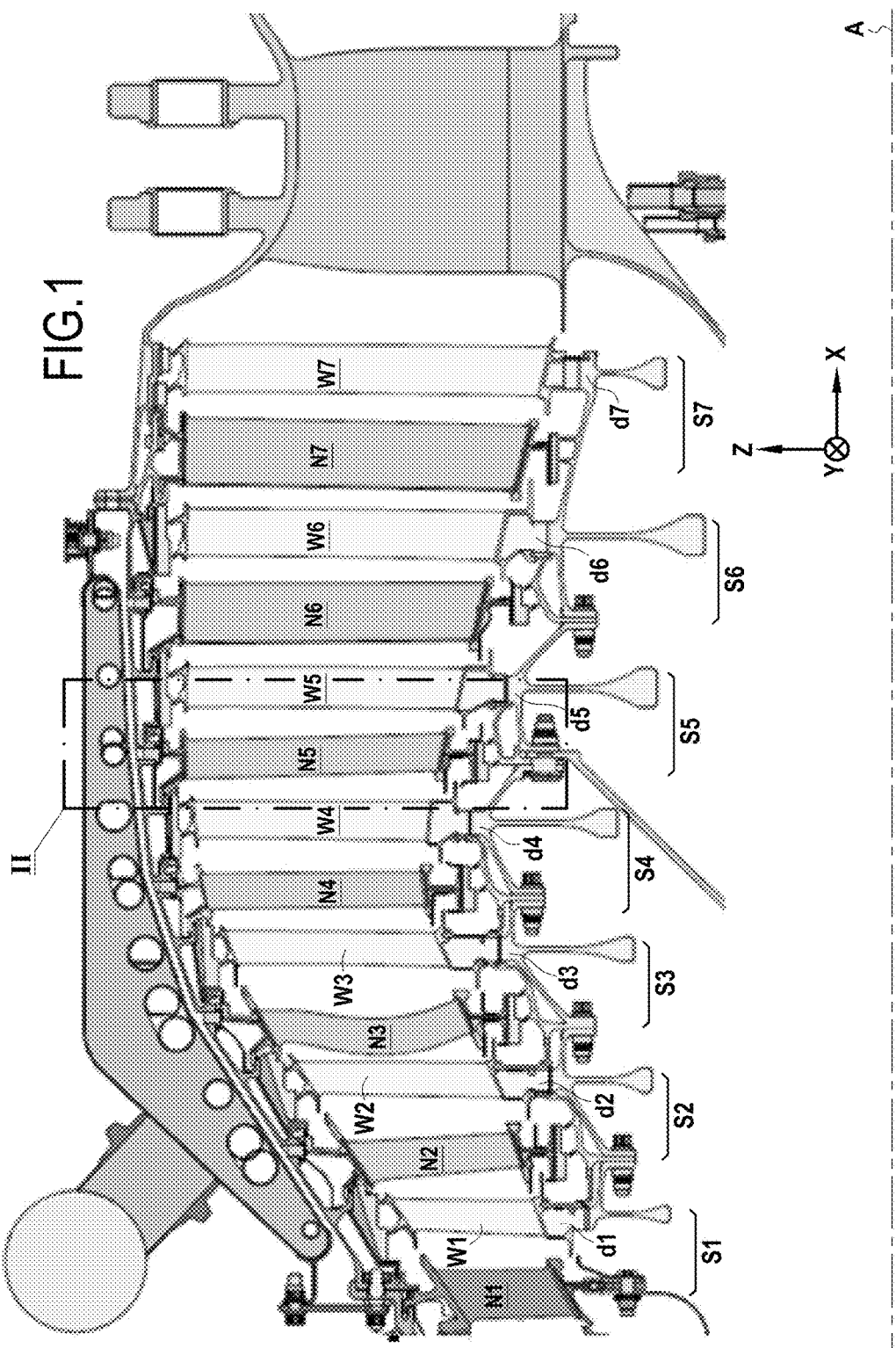
FIG. 1 is a fragmentary axial section view of a turbine including a vane of profile that corresponds to that of the invention.

The turbine shown in axial section in FIG. 1 comprises seven stages referenced respectively S1 to S7. In the direction DF going from upstream to downstream, each stage comprises a nozzle that forms a portion of the stator of the turbine and that has a plurality of radially-oriented vanes, and a rotary wheel that forms a portion of the rotor of the turbine and that likewise includes a plurality of radially-oriented blades.

In FIG. 1, the vanes of the nozzles of stages S1 to S7 are given references N1 to N7, whereas the blades of rotary wheels of stages S1 to S7 are given respective references W1 to W7.

In known manner, the vanes of the nozzles are fastened at both ends to stationary structure portions, while the blades of the rotary wheels are fastened to a rotary disk via their roots that are formed at their radially-inner ends closer to the axis of the rotation A of the turbine. The disks d1 to d7 forming parts of the wheels W1 to W7 are constrained to rotate together.

The invention relates in particular to a vane N5 which is a vane of the nozzle of the fifth stage S5 of the turbine that, as mentioned above, preferably comprises seven stages as shown, without this number being limiting.

Figure 2:
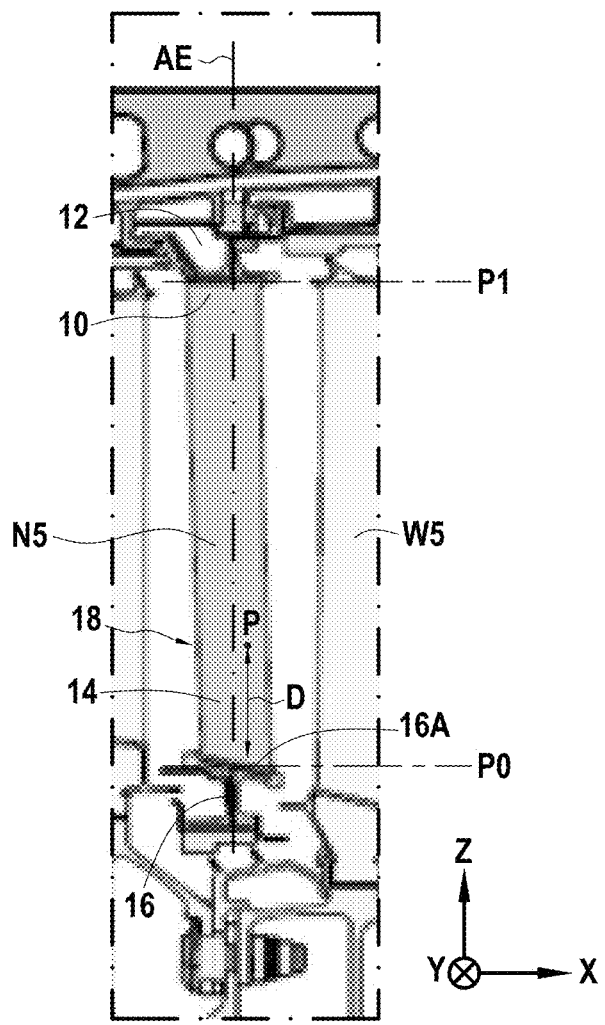
FIG. 2 is an enlarged view of FIG. 1, showing the fifth stage of the turbine.

As best seen in FIG. 2, via its foot 10, which is its end remote from the axis of rotation A, the vane N5 is fastened to the outer ring 12 of the turbine, which ring is stationary in rotation. Via its head 14, formed by its end closer to the axis of rotation A, the vane is fastened to an inner shroud 16 of the turbine. By convention, the aerodynamic profile 18 of the vane is the entire portion of said vane that extends radially outwards from its head 14 to its foot 10 without incorporating the fastenings respectively to the outer ring 12 and to the inner shroud 16.

In FIG. 2, there can be seen a frame of reference comprising Cartesian coordinates X,Y,Z. The radial direction Z is the height direction of the vane, which extends radially from its head to its foot. This direction Z is perpendicular to the axial direction X which is the direction of the axis of rotation A of the turbine. The direction Y is perpendicular to the X,Z plane and is therefore tangential to the direction of rotation of the turbine.

The nominal profile from which the aerodynamic profile of the invention is determined is defined in following Table 1 of coordinates, in which the coordinate Zadim, measured along the axis Z is non-dimensional, whereas the dimensions X and Y, respectively measured along the axes X and Y, are expressed in millimeters.

TABLE 1

| X | Y | Zadim |
|---|---|---|
| −13.4934 | 2.846353 | −0.05624 |
| −13.5334 | 2.808071 | −0.05624 |
| −13.5807 | 2.743066 | −0.05624 |
| −13.6257 | 2.627408 | −0.05624 |
| −13.6403 | 2.454967 | −0.05624 |
| −13.6038 | 2.232309 | −0.05624 |
| −13.5103 | 1.966179 | −0.05624 |
| −13.357 | 1.662348 | −0.05624 |
| −13.1409 | 1.325613 | −0.05624 |
| −12.8586 | 0.961799 | −0.05624 |
| −12.5054 | 0.579086 | −0.05624 |
| −12.0762 | 0.188494 | −0.05624 |
| −11.567 | −0.19641 | −0.05624 |
| −10.9758 | −0.56014 | −0.05624 |
| −10.3032 | −0.8862 | −0.05624 |
| −9.5534 | −1.15791 | −0.05624 |
| −8.73376 | −1.35896 | −0.05624 |
| −7.85507 | −1.4732 | −0.05624 |
| −6.93147 | −1.48534 | −0.05624 |
| −5.97941 | −1.37996 | −0.05624 |
| −5.0221 | −1.14649 | −0.05624 |
| −4.0826 | −0.781 | −0.05624 |
| −3.18218 | −0.29065 | −0.05624 |
| −2.33541 | 0.30782 | −0.05624 |
| −1.54972 | 0.99362 | −0.05624 |
| −0.82859 | 1.74734 | −0.05624 |
| −0.16963 | 2.548846 | −0.05624 |
| 0.433936 | 3.379088 | −0.05624 |
| 0.98771 | 4.22331 | −0.05624 |
| 1.494313 | 5.070795 | −0.05624 |
| 1.961746 | 5.909104 | −0.05624 |
| 2.394726 | 6.729038 | −0.05624 |
| 2.794595 | 7.524035 | −0.05624 |
| 3.166529 | 8.286277 | −0.05624 |
| 3.512166 | 9.010361 | −0.05624 |
| 3.832253 | 9.691878 | −0.05624 |
| 4.129144 | 10.32624 | −0.05624 |
| 4.402253 | 10.91082 | −0.05624 |
| 4.651346 | 11.44348 | −0.05624 |
| 4.877349 | 11.92218 | −0.05624 |
| 5.079241 | 12.34656 | −0.05624 |
| 5.257046 | 12.71652 | −0.05624 |
| 5.410652 | 13.03288 | −0.05624 |
| 5.540215 | 13.29722 | −0.05624 |
| 5.646365 | 13.51184 | −0.05624 |
| 5.730012 | 13.67994 | −0.05624 |
| 5.755476 | 13.81786 | −0.05624 |
| 5.723704 | 13.91065 | −0.05624 |
| 5.685173 | 13.9589 | −0.05624 |
| 5.647365 | 13.98754 | −0.05624 |
| 5.609918 | 14.00534 | −0.05624 |
| 5.55723 | 14.01704 | −0.05624 |
| 5.472188 | 14.00705 | −0.05624 |
| 5.371835 | 13.93688 | −0.05624 |
| 5.286174 | 13.79694 | −0.05624 |
| 5.179784 | 13.61672 | −0.05624 |
| 5.049129 | 13.39505 | −0.05624 |
| 4.893271 | 13.1301 | −0.05624 |
| 4.711606 | 12.82072 | −0.05624 |
| 4.503815 | 12.46638 | −0.05624 |
| 4.269674 | 12.06729 | −0.05624 |
| 4.009438 | 11.62408 | −0.05624 |
| 3.723078 | 11.13821 | −0.05624 |
| 3.411203 | 10.61142 | −0.05624 |
| 3.073319 | 10.04666 | −0.05624 |
| 2.710092 | 9.446749 | −0.05624 |
| 2.321131 | 8.815655 | −0.05624 |
| 1.905549 | 8.158152 | −0.05624 |
| 1.463931 | 7.478571 | −0.05624 |
| 0.993735 | 6.783767 | −0.05624 |
| 0.494626 | 6.07969 | −0.05624 |
| −0.0344 | 5.373329 | −0.05624 |
| −0.59741 | 4.674749 | −0.05624 |
| −1.19467 | 3.992152 | −0.05624 |
| −1.82781 | 3.336021 | −0.05624 |
| −2.49992 | 2.720176 | −0.05624 |
| −3.21178 | 2.159178 | −0.05624 |
| −3.9605 | 1.666842 | −0.05624 |
| −4.74174 | 1.259704 | −0.05624 |
| −5.54666 | 0.953693 | −0.05624 |
| −6.36053 | 0.759601 | −0.05624 |
| −7.16509 | 0.679321 | −0.05624 |
| −7.9384 | 0.705753 | −0.05624 |
| −8.66684 | 0.822823 | −0.05624 |
| −9.33847 | 1.009754 | −0.05624 |
| −9.9485 | 1.243705 | −0.05624 |
| −10.4973 | 1.50251 | −0.05624 |
| −10.9883 | 1.767547 | −0.05624 |
| −11.4256 | 2.024523 | −0.05624 |
| −11.8131 | 2.263363 | −0.05624 |
| −12.1555 | 2.475077 | −0.05624 |
| −12.456 | 2.653824 | −0.05624 |
| −12.7185 | 2.793617 | −0.05624 |
| −12.9453 | 2.889481 | −0.05624 |
| −13.1371 | 2.936717 | −0.05624 |
| −13.2882 | 2.937457 | −0.05624 |
| −13.3927 | 2.908525 | −0.05624 |
| −13.6519 | 2.964973 | −0.02812 |
| −13.6925 | 2.926345 | −0.02812 |
| −13.7407 | 2.86067 | −0.02812 |
| −13.787 | 2.743791 | −0.02812 |
| −13.8036 | 2.569272 | −0.02812 |
| −13.7704 | 2.343117 | −0.02812 |
| −13.681 | 2.071731 | −0.02812 |
| −13.5322 | 1.760707 | −0.02812 |
| −13.321 | 1.414794 | −0.02812 |

TABLE 1-continued

| X | Y | Zadim |
|---|---|---|
| −13.0435 | 1.039774 | −0.02812 |
| −12.6949 | 0.643698 | −0.02812 |
| −12.27 | 0.237395 | −0.02812 |
| −11.7644 | −0.16571 | −0.02812 |
| −11.1755 | −0.55004 | −0.02812 |
| −10.5033 | −0.89858 | −0.02812 |
| −9.75108 | −1.19349 | −0.02812 |
| −8.9257 | −1.41648 | −0.02812 |
| −8.03779 | −1.54894 | −0.02812 |
| −7.10246 | −1.57305 | −0.02812 |
| −6.13728 | −1.47203 | −0.02812 |
| −5.1675 | −1.23541 | −0.02812 |
| −4.21744 | −0.86086 | −0.02812 |
| −3.3089 | −0.35753 | −0.02812 |
| −2.45647 | 0.256297 | −0.02812 |
| −1.66725 | 0.958686 | −0.02812 |
| −0.94417 | 1.729313 | −0.02812 |
| −0.28429 | 2.547554 | −0.02812 |
| 0.319387 | 3.394239 | −0.02812 |
| 0.872654 | 4.254517 | −0.02812 |
| 1.378417 | 5.117486 | −0.02812 |
| 1.844789 | 5.970702 | −0.02812 |
| 2.276627 | 6.8049 | −0.02812 |
| 2.675326 | 7.613464 | −0.02812 |
| 3.046101 | 8.388569 | −0.02812 |
| 3.390713 | 9.124728 | −0.02812 |
| 3.70989 | 9.817515 | −0.02812 |
| 4.006016 | 10.46231 | −0.02812 |
| 4.278461 | 11.05649 | −0.02812 |
| 4.527094 | 11.59783 | −0.02812 |
| 4.752722 | 12.08434 | −0.02812 |
| 4.954376 | 12.51562 | −0.02812 |
| 5.132026 | 12.89159 | −0.02812 |
| 5.28555 | 13.21309 | −0.02812 |
| 5.415085 | 13.48172 | −0.02812 |
| 5.521236 | 13.69982 | −0.02812 |
| 5.604913 | 13.87063 | −0.02812 |
| 5.631656 | 14.01016 | −0.02812 |
| 5.59951 | 14.10416 | −0.02812 |
| 5.56017 | 14.15281 | −0.02812 |
| 5.521563 | 14.18141 | −0.02812 |
| 5.483414 | 14.19889 | −0.02812 |
| 5.4299 | 14.20982 | −0.02812 |
| 5.344049 | 14.19777 | −0.02812 |
| 5.244616 | 14.12393 | −0.02812 |
| 5.158928 | 13.98169 | −0.02812 |
| 5.052293 | 13.79868 | −0.02812 |
| 4.921377 | 13.57356 | −0.02812 |
| 4.765255 | 13.30447 | −0.02812 |
| 4.58334 | 12.99022 | −0.02812 |
| 4.375352 | 12.63027 | −0.02812 |
| 4.141104 | 12.22477 | −0.02812 |
| 3.880865 | 11.77438 | −0.02812 |
| 3.594683 | 11.28053 | −0.02812 |
| 3.283139 | 10.74497 | −0.02812 |
| 2.945812 | 10.17065 | −0.02812 |
| 2.583414 | 9.560369 | −0.02812 |
| 2.1955 | 8.918152 | −0.02812 |
| 1.781256 | 8.248737 | −0.02812 |
| 1.341216 | 7.556515 | −0.02812 |
| 0.872756 | 6.848364 | −0.02812 |
| 0.375529 | 6.130249 | −0.02812 |
| −0.1516 | 5.409228 | −0.02812 |
| −0.71285 | 4.695412 | −0.02812 |
| −1.30875 | 3.997165 | −0.02812 |
| −1.94116 | 3.325125 | −0.02812 |
| −2.61346 | 2.693327 | −0.02812 |
| −3.32691 | 2.116799 | −0.02812 |
| −4.07913 | 1.610213 | −0.02812 |
| −4.8661 | 1.191167 | −0.02812 |
| −5.67896 | 0.87695 | −0.02812 |
| −6.50252 | 0.680065 | −0.02812 |
| −7.31733 | 0.603798 | −0.02812 |
| −8.09945 | 0.641131 | −0.02812 |
| −8.83427 | 0.774419 | −0.02812 |
| −9.50909 | 0.980442 | −0.02812 |
| −10.1197 | 1.234245 | −0.02812 |
| −10.6672 | 1.512406 | −0.02812 |
| −11.1557 | 1.79568 | −0.02812 |
| −11.5899 | 2.069499 | −0.02812 |
| −11.9741 | 2.323678 | −0.02812 |
| −12.3135 | 2.549064 | −0.02812 |
| −12.6115 | 2.739982 | −0.02812 |
| −12.8722 | 2.890405 | −0.02812 |
| −13.0983 | 2.99536 | −0.02812 |
| −13.2905 | 3.04985 | −0.02812 |
| −13.4434 | 3.054889 | −0.02812 |
| −13.5496 | 3.02725 | −0.02812 |
| −13.8103 | 3.083561 | 0 |
| −13.8516 | 3.044581 | 0 |
| −13.9007 | 2.978225 | 0 |
| −13.9483 | 2.860103 | 0 |
| −13.967 | 2.683501 | 0 |
| −13.9369 | 2.453865 | 0 |
| −13.8516 | 2.177267 | 0 |
| −13.7075 | 1.859117 | 0 |
| −13.5012 | 1.504114 | 0 |
| −13.2287 | 1.117993 | 0 |
| −12.8849 | 0.708673 | 0 |
| −12.4646 | 0.286796 | 0 |
| −11.9629 | −0.13436 | 0 |
| −11.3766 | −0.53915 | 0 |
| −10.7051 | −0.91005 | 0 |
| −9.95095 | −1.22808 | 0 |
| −9.12019 | −1.47309 | 0 |
| −8.22326 | −1.62402 | 0 |
| −7.27617 | −1.66056 | 0 |
| −6.29772 | −1.56447 | 0 |
| −5.31517 | −1.32524 | 0 |
| −4.35421 | −0.94205 | 0 |
| −3.43726 | −0.42601 | 0 |
| −2.57892 | 0.203001 | 0 |
| −1.786 | 0.9219 | 0 |
| −1.06081 | 1.709415 | 0 |
| −0.39991 | 2.54441 | 0 |
| 0.203984 | 3.407571 | 0 |
| 0.756842 | 4.283947 | 0 |
| 1.261855 | 5.162458 | 0 |
| 1.72725 | 6.030645 | 0 |
| 2.158034 | 6.879168 | 0 |
| 2.555651 | 7.701364 | 0 |
| 2.925348 | 8.489394 | 0 |
| 3.269025 | 9.237688 | 0 |
| 3.587373 | 9.941802 | 0 |
| 3.88282 | 10.59709 | 0 |
| 4.154689 | 11.20091 | 0 |
| 4.402944 | 11.75096 | 0 |
| 4.628276 | 12.24532 | 0 |
| 4.829769 | 12.68352 | 0 |
| 5.007336 | 13.06553 | 0 |
| 5.160839 | 13.39219 | 0 |
| 5.290396 | 13.66512 | 0 |
| 5.396593 | 13.88672 | 0 |
| 5.48034 | 14.06026 | 0 |
| 5.508382 | 14.20141 | 0 |
| 5.475882 | 14.29664 | 0 |
| 5.435736 | 14.34569 | 0 |
| 5.396331 | 14.37427 | 0 |
| 5.357483 | 14.39145 | 0 |
| 5.303147 | 14.40161 | 0 |
| 5.216499 | 14.38753 | 0 |
| 5.117986 | 14.31011 | 0 |
| 5.032222 | 14.16556 | 0 |
| 4.925291 | 13.97975 | 0 |
| 4.794051 | 13.75116 | 0 |
| 4.637591 | 13.47789 | 0 |
| 4.455349 | 13.15873 | 0 |
| 4.247068 | 12.7931 | 0 |
| 4.012614 | 12.38115 | 0 |
| 3.752281 | 11.92351 | 0 |
| 3.466158 | 11.42161 | 0 |
| 3.154839 | 10.87721 | 0 |
| 2.81796 | 10.29324 | 0 |
| 2.456284 | 9.672514 | 0 |
| 2.069313 | 9.019089 | 0 |
| 1.656311 | 8.337673 | 0 |

TABLE 1-continued

| X | Y | Zadim |
|---|---|---|
| 1.217755 | 7.632718 | 0 |
| 0.750941 | 6.911134 | 0 |
| 0.255517 | 6.178895 | 0 |
| −0.26979 | 5.44314 | 0 |
| −0.82937 | 4.714024 | 0 |
| −1.424 | 4.000077 | 0 |
| −2.05576 | 3.312094 | 0 |
| −2.7284 | 2.664354 | 0 |
| −3.44364 | 2.072365 | 0 |
| −4.19962 | 1.551693 | 0 |
| −4.99264 | 1.121032 | 0 |
| −5.81387 | 0.799094 | 0 |
| −6.6476 | 0.600091 | 0 |
| −7.47273 | 0.528604 | 0 |
| −8.26383 | 0.57749 | 0 |
| −9.00471 | 0.727382 | 0 |
| −9.68242 | 0.952623 | 0 |
| −10.2932 | 1.226222 | 0 |
| −10.8391 | 1.523592 | 0 |
| −11.3247 | 1.82492 | 0 |
| −11.7556 | 2.115391 | 0 |
| −12.1362 | 2.384712 | 0 |
| −12.4723 | 2.623603 | 0 |
| −12.7675 | 2.826534 | 0 |
| −13.0262 | 2.987445 | 0 |
| −13.2513 | 3.101372 | 0 |
| −13.4439 | 3.16303 | 0 |
| −13.5985 | 3.172318 | 0 |
| −13.7064 | 3.145957 | 0 |
| −14.3653 | 3.467146 | 0.1 |
| −14.4088 | 3.42697 | 0.1 |
| −14.4608 | 3.358311 | 0.1 |
| −14.5128 | 3.235995 | 0.1 |
| −14.5384 | 3.0525 | 0.1 |
| −14.5192 | 2.811468 | 0.1 |
| −14.4476 | 2.518112 | 0.1 |
| −14.319 | 2.177088 | 0.1 |
| −14.129 | 1.792989 | 0.1 |
| −13.8731 | 1.371411 | 0.1 |
| −13.5455 | 0.919904 | 0.1 |
| −13.1405 | 0.448567 | 0.1 |
| −12.6521 | −0.02971 | 0.1 |
| −12.0755 | −0.49902 | 0.1 |
| −11.4076 | −0.94028 | 0.1 |
| −10.6481 | −1.33102 | 0.1 |
| −9.80073 | −1.64535 | 0.1 |
| −8.8749 | −1.8547 | 0.1 |
| −7.88838 | −1.9308 | 0.1 |
| −6.86599 | −1.85043 | 0.1 |
| −5.84022 | −1.60247 | 0.1 |
| −4.8423 | −1.19057 | 0.1 |
| −3.89674 | −0.63231 | 0.1 |
| −3.01816 | 0.046965 | 0.1 |
| −2.21222 | 0.820325 | 0.1 |
| −1.47923 | 1.663479 | 0.1 |
| −0.81398 | 2.55372 | 0.1 |
| −0.20831 | 3.47118 | 0.1 |
| 0.344415 | 4.400592 | 0.1 |
| 0.848188 | 5.330367 | 0.1 |
| 1.311552 | 6.24799 | 0.1 |
| 1.740076 | 7.143849 | 0.1 |
| 2.135323 | 8.011117 | 0.1 |
| 2.502573 | 8.841929 | 0.1 |
| 2.844232 | 9.630405 | 0.1 |
| 3.160808 | 10.37207 | 0.1 |
| 3.454883 | 11.06215 | 0.1 |
| 3.725676 | 11.69793 | 0.1 |
| 3.973393 | 12.27693 | 0.1 |
| 4.198377 | 12.79735 | 0.1 |
| 4.399872 | 13.25857 | 0.1 |
| 4.577615 | 13.66065 | 0.1 |
| 4.731423 | 14.00447 | 0.1 |
| 4.861368 | 14.29173 | 0.1 |
| 4.967966 | 14.52496 | 0.1 |
| 5.052115 | 14.70757 | 0.1 |
| 5.084682 | 14.85418 | 0.1 |
| 5.051254 | 14.95358 | 0.1 |
| 5.008484 | 15.0041 | 0.1 |
| 4.966473 | 15.03266 | 0.1 |
| 4.925338 | 15.04889 | 0.1 |
| 4.868315 | 15.05658 | 0.1 |
| 4.779184 | 15.03593 | 0.1 |
| 4.683705 | 14.94729 | 0.1 |
| 4.597422 | 14.79506 | 0.1 |
| 4.489209 | 14.59986 | 0.1 |
| 4.356516 | 14.35967 | 0.1 |
| 4.198482 | 14.07246 | 0.1 |
| 4.014606 | 13.73692 | 0.1 |
| 3.804736 | 13.3524 | 0.1 |
| 3.568849 | 12.91898 | 0.1 |
| 3.30737 | 12.43725 | 0.1 |
| 3.020545 | 11.90859 | 0.1 |
| 2.708932 | 11.33488 | 0.1 |
| 2.372423 | 10.71896 | 0.1 |
| 2.011935 | 10.06367 | 0.1 |
| 1.626783 | 9.373232 | 0.1 |
| 1.216556 | 8.652247 | 0.1 |
| 0.781506 | 7.905394 | 0.1 |
| 0.318718 | 7.139673 | 0.1 |
| −0.1721 | 6.361072 | 0.1 |
| −0.69273 | 5.577017 | 0.1 |
| −1.24805 | 4.797806 | 0.1 |
| −1.83953 | 4.03242 | 0.1 |
| −2.47006 | 3.292111 | 0.1 |
| −3.14461 | 2.592 | 0.1 |
| −3.8664 | 1.949068 | 0.1 |
| −4.63553 | 1.381799 | 0.1 |
| −5.44954 | 0.912571 | 0.1 |
| −6.2997 | 0.565223 | 0.1 |
| −7.16808 | 0.359784 | 0.1 |
| −8.02785 | 0.304661 | 0.1 |
| −8.84923 | 0.391228 | 0.1 |
| −9.60934 | 0.593832 | 0.1 |
| −10.2958 | 0.879097 | 0.1 |
| −10.9067 | 1.214113 | 0.1 |
| −11.4464 | 1.571028 | 0.1 |
| −11.9221 | 1.928449 | 0.1 |
| −12.3408 | 2.27085 | 0.1 |
| −12.7089 | 2.587435 | 0.1 |
| −13.0331 | 2.868726 | 0.1 |
| −13.318 | 3.109423 | 0.1 |
| −13.569 | 3.303327 | 0.1 |
| −13.7899 | 3.445509 | 0.1 |
| −13.9828 | 3.529724 | 0.1 |
| −14.1425 | 3.552365 | 0.1 |
| −14.2559 | 3.530021 | 0.1 |
| −14.8946 | 3.736443 | 0.2 |
| −14.9399 | 3.695126 | 0.2 |
| −14.9941 | 3.624457 | 0.2 |
| −15.0496 | 3.498643 | 0.2 |
| −15.0807 | 3.309541 | 0.2 |
| −15.0697 | 3.059558 | 0.2 |
| −15.008 | 2.753339 | 0.2 |
| −14.8901 | 2.395176 | 0.2 |
| −14.711 | 1.989623 | 0.2 |
| −14.4656 | 1.542266 | 0.2 |
| −14.1479 | 1.060505 | 0.2 |
| −13.7515 | 0.554201 | 0.2 |
| −13.2701 | 0.036112 | 0.2 |
| −12.6976 | −0.47755 | 0.2 |
| −12.0293 | −0.96654 | 0.2 |
| −11.2627 | −1.40596 | 0.2 |
| −10.3998 | −1.7659 | 0.2 |
| −9.44941 | −2.01251 | 0.2 |
| −8.42979 | −2.11159 | 0.2 |
| −7.37224 | −2.03598 | 0.2 |
| −6.31234 | −1.77391 | 0.2 |
| −5.28614 | −1.33254 | 0.2 |
| −4.31984 | −0.73484 | 0.2 |
| −3.42748 | −0.01084 | 0.2 |
| −2.61348 | 0.809601 | 0.2 |
| −1.87624 | 1.699956 | 0.2 |
| −1.20908 | 2.636478 | 0.2 |
| −0.60294 | 3.598949 | 0.2 |
| −0.05091 | 4.572065 | 0.2 |
| 0.451635 | 5.543913 | 0.2 |

TABLE 1-continued

| X | Y | Zadim |
|---|---|---|
| 0.913421 | 6.501993 | 0.2 |
| 1.340346 | 7.436545 | 0.2 |
| 1.734074 | 8.340599 | 0.2 |
| 2.099801 | 9.206322 | 0.2 |
| 2.440295 | 10.02759 | 0.2 |
| 2.755905 | 10.79991 | 0.2 |
| 3.049302 | 11.5184 | 0.2 |
| 3.319628 | 12.18028 | 0.2 |
| 3.567233 | 12.78297 | 0.2 |
| 3.792204 | 13.3247 | 0.2 |
| 3.99391 | 13.80479 | 0.2 |
| 4.171957 | 14.22332 | 0.2 |
| 4.326127 | 14.58121 | 0.2 |
| 4.456465 | 14.88023 | 0.2 |
| 4.563437 | 15.12302 | 0.2 |
| 4.647923 | 15.31311 | 0.2 |
| 4.684316 | 15.46419 | 0.2 |
| 4.650292 | 15.56708 | 0.2 |
| 4.60538 | 15.61882 | 0.2 |
| 4.561246 | 15.64737 | 0.2 |
| 4.518269 | 15.6628 | 0.2 |
| 4.4591 | 15.66848 | 0.2 |
| 4.368199 | 15.64256 | 0.2 |
| 4.275231 | 15.5453 | 0.2 |
| 4.188397 | 15.38679 | 0.2 |
| 4.078976 | 15.18388 | 0.2 |
| 3.94489 | 14.93417 | 0.2 |
| 3.785313 | 14.63554 | 0.2 |
| 3.599792 | 14.28659 | 0.2 |
| 3.388249 | 13.88662 | 0.2 |
| 3.150771 | 13.43565 | 0.2 |
| 2.887832 | 12.93427 | 0.2 |
| 2.599869 | 12.38381 | 0.2 |
| 2.28738 | 11.78625 | 0.2 |
| 1.950493 | 11.14435 | 0.2 |
| 1.590231 | 10.461 | 0.2 |
| 1.205786 | 9.740568 | 0.2 |
| 0.797078 | 8.987538 | 0.2 |
| 0.364117 | 8.206805 | 0.2 |
| −0.09603 | 7.405383 | 0.2 |
| −0.58363 | 6.58929 | 0.2 |
| −1.10077 | 5.766137 | 0.2 |
| −1.65267 | 4.946261 | 0.2 |
| −2.24131 | 4.138949 | 0.2 |
| −2.87005 | 3.355622 | 0.2 |
| −3.5449 | 2.611936 | 0.2 |
| −4.27038 | 1.925876 | 0.2 |
| −5.04835 | 1.318035 | 0.2 |
| −5.87758 | 0.813453 | 0.2 |
| −6.74993 | 0.440254 | 0.2 |
| −7.64563 | 0.22331 | 0.2 |
| −8.53328 | 0.174066 | 0.2 |
| −9.38044 | 0.282369 | 0.2 |
| −10.1578 | 0.517648 | 0.2 |
| −10.854 | 0.841052 | 0.2 |
| −11.4682 | 1.215801 | 0.2 |
| −12.0064 | 1.611915 | 0.2 |
| −12.4772 | 2.006892 | 0.2 |
| −12.8889 | 2.384588 | 0.2 |
| −13.2489 | 2.733572 | 0.2 |
| −13.5653 | 3.044231 | 0.2 |
| −13.8429 | 3.311256 | 0.2 |
| −14.0884 | 3.528134 | 0.2 |
| −14.3064 | 3.689843 | 0.2 |
| −14.4997 | 3.789326 | 0.2 |
| −14.6633 | 3.820561 | 0.2 |
| −14.7811 | 3.800373 | 0.2 |
| −15.3978 | 3.889359 | 0.3 |
| −15.4442 | 3.846981 | 0.3 |
| −15.5001 | 3.774652 | 0.3 |
| −15.5582 | 3.64615 | 0.3 |
| −15.5933 | 3.45279 | 0.3 |
| −15.5877 | 3.196209 | 0.3 |
| −15.5318 | 2.880775 | 0.3 |
| −15.4193 | 2.510775 | 0.3 |
| −15.245 | 2.090843 | 0.3 |
| −15.0033 | 1.626685 | 0.3 |
| −14.6881 | 1.125768 | 0.3 |
| −14.2927 | 0.597971 | 0.3 |
| −13.8105 | 0.056191 | 0.3 |
| −13.2347 | −0.48294 | 0.3 |
| −12.5595 | −0.99817 | 0.3 |
| −11.7816 | −1.46279 | 0.3 |
| −10.9019 | −1.84408 | 0.3 |
| −9.92921 | −2.10456 | 0.3 |
| −8.8831 | −2.20619 | 0.3 |
| −7.79973 | −2.11972 | 0.3 |
| −6.71697 | −1.83389 | 0.3 |
| −5.6741 | −1.35938 | 0.3 |
| −4.6975 | −0.72349 | 0.3 |
| −3.79994 | 0.040392 | 0.3 |
| −2.98443 | 0.900631 | 0.3 |
| −2.24762 | 1.829481 | 0.3 |
| −1.58174 | 2.802812 | 0.3 |
| −0.97714 | 3.800457 | 0.3 |
| −0.42687 | 4.807328 | 0.3 |
| 0.07411 | 5.811377 | 0.3 |
| 0.534488 | 6.800235 | 0.3 |
| 0.960239 | 7.76413 | 0.3 |
| 1.353114 | 8.695998 | 0.3 |
| 1.718092 | 9.588067 | 0.3 |
| 2.058146 | 10.43408 | 0.3 |
| 2.3735 | 11.22951 | 0.3 |
| 2.666819 | 11.96943 | 0.3 |
| 2.937177 | 12.65102 | 0.3 |
| 3.185017 | 13.27159 | 0.3 |
| 3.41023 | 13.82944 | 0.3 |
| 3.612277 | 14.3238 | 0.3 |
| 3.790679 | 14.7548 | 0.3 |
| 3.945196 | 15.12338 | 0.3 |
| 4.075869 | 15.43134 | 0.3 |
| 4.183142 | 15.6814 | 0.3 |
| 4.267873 | 15.87719 | 0.3 |
| 4.307333 | 16.03161 | 0.3 |
| 4.272936 | 16.13721 | 0.3 |
| 4.226394 | 16.18988 | 0.3 |
| 4.180649 | 16.21839 | 0.3 |
| 4.136296 | 16.23321 | 0.3 |
| 4.075552 | 16.23735 | 0.3 |
| 3.983465 | 16.20758 | 0.3 |
| 3.892431 | 16.10407 | 0.3 |
| 3.805122 | 15.94085 | 0.3 |
| 3.694667 | 15.7322 | 0.3 |
| 3.559374 | 15.47539 | 0.3 |
| 3.398432 | 15.16823 | 0.3 |
| 3.211416 | 14.8093 | 0.3 |
| 2.998302 | 14.39783 | 0.3 |
| 2.759245 | 13.93381 | 0.3 |
| 2.494764 | 13.41785 | 0.3 |
| 2.205421 | 12.85123 | 0.3 |
| 1.891671 | 12.23601 | 0.3 |
| 1.553864 | 11.57489 | 0.3 |
| 1.193075 | 10.87082 | 0.3 |
| 0.808442 | 10.12823 | 0.3 |
| 0.400188 | 9.351517 | 0.3 |
| −0.03187 | 8.545755 | 0.3 |
| −0.49052 | 7.717892 | 0.3 |
| −0.97601 | 6.873974 | 0.3 |
| −1.49056 | 6.021674 | 0.3 |
| −2.0394 | 5.171221 | 0.3 |
| −2.62496 | 4.332082 | 0.3 |
| −3.25067 | 3.515561 | 0.3 |
| −3.92313 | 2.737366 | 0.3 |
| −4.64786 | 2.015886 | 0.3 |
| −5.42813 | 1.37277 | 0.3 |
| −6.26386 | 0.834309 | 0.3 |
| −7.1482 | 0.431338 | 0.3 |
| −8.06158 | 0.192437 | 0.3 |
| −8.96938 | 0.132263 | 0.3 |
| −9.83776 | 0.241039 | 0.3 |
| −10.6326 | 0.485886 | 0.3 |
| −11.3419 | 0.824645 | 0.3 |
| −11.9649 | 1.217921 | 0.3 |
| −12.5082 | 1.634073 | 0.3 |
| −12.9809 | 2.049519 | 0.3 |
| −13.3921 | 2.447356 | 0.3 |

TABLE 1-continued

| X | Y | Zadim |
|---|---|---|
| −13.7502 | 2.815421 | 0.3 |
| −14.0639 | 3.143718 | 0.3 |
| −14.3387 | 3.426809 | 0.3 |
| −14.5821 | 3.657721 | 0.3 |
| −14.7994 | 3.831153 | 0.3 |
| −14.9941 | 3.939362 | 0.3 |
| −15.1608 | 3.974797 | 0.3 |
| −15.2816 | 3.954905 | 0.3 |
| −15.8748 | 3.925899 | 0.4 |
| −15.9218 | 3.882553 | 0.4 |
| −15.9785 | 3.808946 | 0.4 |
| −16.0384 | 3.678599 | 0.4 |
| −16.076 | 3.482335 | 0.4 |
| −16.073 | 3.221367 | 0.4 |
| −16.0186 | 2.900173 | 0.4 |
| −15.9061 | 2.523331 | 0.4 |
| −15.7303 | 2.095712 | 0.4 |
| −15.4853 | 1.623288 | 0.4 |
| −15.165 | 1.113789 | 0.4 |
| −14.7625 | 0.577374 | 0.4 |
| −14.2711 | 0.02733 | 0.4 |
| −13.6839 | −0.51909 | 0.4 |
| −12.9948 | −1.03967 | 0.4 |
| −12.2002 | −1.50621 | 0.4 |
| −11.3013 | −1.88407 | 0.4 |
| −10.308 | −2.13365 | 0.4 |
| −9.24263 | −2.21531 | 0.4 |
| −8.14338 | −2.10012 | 0.4 |
| −7.05075 | −1.77916 | 0.4 |
| −6.00429 | −1.26688 | 0.4 |
| −5.02893 | −0.59377 | 0.4 |
| −4.13545 | 0.205088 | 0.4 |
| −3.3253 | 1.097657 | 0.4 |
| −2.59376 | 2.056006 | 0.4 |
| −1.93232 | 3.056365 | 0.4 |
| −1.33126 | 4.079093 | 0.4 |
| −0.78381 | 5.109526 | 0.4 |
| −0.28468 | 6.13564 | 0.4 |
| 0.174499 | 7.145355 | 0.4 |
| 0.599553 | 8.129 | 0.4 |
| 0.992268 | 9.079463 | 0.4 |
| 1.357315 | 9.989089 | 0.4 |
| 1.697693 | 10.85157 | 0.4 |
| 2.013542 | 11.66234 | 0.4 |
| 2.307399 | 12.41652 | 0.4 |
| 2.5783 | 13.11121 | 0.4 |
| 2.826749 | 13.7437 | 0.4 |
| 3.052463 | 14.3123 | 0.4 |
| 3.254989 | 14.81622 | 0.4 |
| 3.433797 | 15.25557 | 0.4 |
| 3.588651 | 15.63133 | 0.4 |
| 3.719603 | 15.94531 | 0.4 |
| 3.827093 | 16.20028 | 0.4 |
| 3.911988 | 16.39992 | 0.4 |
| 3.953794 | 16.55651 | 0.4 |
| 3.919174 | 16.664 | 0.4 |
| 3.871528 | 16.71727 | 0.4 |
| 3.824686 | 16.74574 | 0.4 |
| 3.779429 | 16.76011 | 0.4 |
| 3.717669 | 16.76321 | 0.4 |
| 3.624874 | 16.73102 | 0.4 |
| 3.535173 | 16.62344 | 0.4 |
| 3.447496 | 16.45717 | 0.4 |
| 3.336213 | 16.24481 | 0.4 |
| 3.199936 | 15.98344 | 0.4 |
| 3.037844 | 15.67083 | 0.4 |
| 2.849522 | 15.30551 | 0.4 |
| 2.634973 | 14.88671 | 0.4 |
| 2.394396 | 14.41439 | 0.4 |
| 2.128311 | 13.88916 | 0.4 |
| 1.837383 | 13.3123 | 0.4 |
| 1.522013 | 12.6859 | 0.4 |
| 1.182737 | 12.01264 | 0.4 |
| 0.820647 | 11.29547 | 0.4 |
| 0.434909 | 10.53888 | 0.4 |
| 0.025991 | 9.747191 | 0.4 |
| −0.40639 | 8.925568 | 0.4 |
| −0.86477 | 8.080833 | 0.4 |
| −1.34936 | 7.219055 | 0.4 |
| −1.86232 | 6.347848 | 0.4 |
| −2.40857 | 5.477166 | 0.4 |
| −2.99082 | 4.616529 | 0.4 |
| −3.61233 | 3.776895 | 0.4 |
| −4.27966 | 2.973479 | 0.4 |
| −4.99889 | 2.224408 | 0.4 |
| −5.77427 | 1.55129 | 0.4 |
| −6.60673 | 0.980157 | 0.4 |
| −7.49126 | 0.542602 | 0.4 |
| −8.41037 | 0.269442 | 0.4 |
| −9.3299 | 0.17886 | 0.4 |
| −10.2141 | 0.264133 | 0.4 |
| −11.0272 | 0.49347 | 0.4 |
| −11.7539 | 0.823779 | 0.4 |
| −12.3922 | 1.214103 | 0.4 |
| −12.948 | 1.631357 | 0.4 |
| −13.4302 | 2.050745 | 0.4 |
| −13.8482 | 2.454302 | 0.4 |
| −14.2109 | 2.828989 | 0.4 |
| −14.5277 | 3.164075 | 0.4 |
| −14.8044 | 3.453763 | 0.4 |
| −15.0494 | 3.690544 | 0.4 |
| −15.2685 | 3.868576 | 0.4 |
| −15.4657 | 3.979511 | 0.4 |
| −15.635 | 4.015007 | 0.4 |
| −15.7575 | 3.993587 | 0.4 |
| −16.3258 | 3.846056 | 0.5 |
| −16.3728 | 3.801841 | 0.5 |
| −16.4296 | 3.72733 | 0.5 |
| −16.4902 | 3.595962 | 0.5 |
| −16.5289 | 3.398096 | 0.5 |
| −16.5255 | 3.134843 | 0.5 |
| −16.4683 | 2.811232 | 0.5 |
| −16.3504 | 2.432435 | 0.5 |
| −16.1667 | 2.003742 | 0.5 |
| −15.9113 | 1.531549 | 0.5 |
| −15.578 | 1.024055 | 0.5 |
| −15.1603 | 0.491955 | 0.5 |
| −14.6513 | −0.0508 | 0.5 |
| −14.0445 | −0.58613 | 0.5 |
| −13.3343 | −1.0908 | 0.5 |
| −12.5179 | −1.53547 | 0.5 |
| −11.5982 | −1.88444 | 0.5 |
| −10.5872 | −2.09763 | 0.5 |
| −9.51052 | −2.13631 | 0.5 |
| −8.40669 | −1.97463 | 0.5 |
| −7.31814 | −1.60784 | 0.5 |
| −6.28152 | −1.05415 | 0.5 |
| −5.31874 | −0.34565 | 0.5 |
| −4.43812 | 0.482689 | 0.5 |
| −3.63967 | 1.399745 | 0.5 |
| −2.9176 | 2.3784 | 0.5 |
| −2.26327 | 3.39594 | 0.5 |
| −1.66734 | 4.433689 | 0.5 |
| −1.12341 | 5.477541 | 0.5 |
| −0.62613 | 6.515665 | 0.5 |
| −0.16773 | 7.536414 | 0.5 |
| 0.257294 | 8.530306 | 0.5 |
| 0.650701 | 9.490244 | 0.5 |
| 1.016755 | 10.40873 | 0.5 |
| 1.358337 | 11.27949 | 0.5 |
| 1.675521 | 12.09793 | 0.5 |
| 1.970606 | 12.85925 | 0.5 |
| 2.242633 | 13.56053 | 0.5 |
| 2.492132 | 14.19902 | 0.5 |
| 2.71866 | 14.77307 | 0.5 |
| 2.921853 | 15.28185 | 0.5 |
| 3.101163 | 15.7255 | 0.5 |
| 3.256378 | 16.10496 | 0.5 |
| 3.38758 | 16.42207 | 0.5 |
| 3.495234 | 16.6796 | 0.5 |
| 3.580228 | 16.88127 | 0.5 |
| 3.623722 | 17.03887 | 0.5 |
| 3.589011 | 17.14742 | 0.5 |
| 3.54078 | 17.20098 | 0.5 |
| 3.493351 | 17.2294 | 0.5 |
| 3.447644 | 17.24352 | 0.5 |

TABLE 1-continued

| X | Y | Zadim |
|---|---|---|
| 3.385396 | 17.24607 | 0.5 |
| 3.292287 | 17.21283 | 0.5 |
| 3.203319 | 17.10316 | 0.5 |
| 3.115367 | 16.93546 | 0.5 |
| 3.003449 | 16.72145 | 0.5 |
| 2.866379 | 16.45804 | 0.5 |
| 2.703325 | 16.14301 | 0.5 |
| 2.513854 | 15.77488 | 0.5 |
| 2.297964 | 15.35287 | 0.5 |
| 2.055868 | 14.87695 | 0.5 |
| 1.788057 | 14.34773 | 0.5 |
| 1.495262 | 13.76649 | 0.5 |
| 1.177844 | 13.13534 | 0.5 |
| 0.836441 | 12.45694 | 0.5 |
| 0.47217 | 11.73425 | 0.5 |
| 0.084274 | 10.97174 | 0.5 |
| −0.32659 | 10.17368 | 0.5 |
| −0.76072 | 9.345253 | 0.5 |
| −1.22029 | 8.493119 | 0.5 |
| −1.70546 | 7.623325 | 0.5 |
| −2.21816 | 6.74335 | 0.5 |
| −2.76272 | 5.862703 | 0.5 |
| −3.34194 | 4.990832 | 0.5 |
| −3.95866 | 4.138193 | 0.5 |
| −4.61884 | 3.319031 | 0.5 |
| −5.32857 | 2.550588 | 0.5 |
| −6.0926 | 1.853478 | 0.5 |
| −6.91253 | 1.252092 | 0.5 |
| −7.78535 | 0.776703 | 0.5 |
| −8.69698 | 0.458419 | 0.5 |
| −9.61825 | 0.318598 | 0.5 |
| −10.5115 | 0.35597 | 0.5 |
| −11.3418 | 0.543587 | 0.5 |
| −12.0894 | 0.840308 | 0.5 |
| −12.7491 | 1.205009 | 0.5 |
| −13.3247 | 1.603556 | 0.5 |
| −13.8241 | 2.009834 | 0.5 |
| −14.2564 | 2.404468 | 0.5 |
| −14.6304 | 2.773298 | 0.5 |
| −14.9561 | 3.104512 | 0.5 |
| −15.2398 | 3.391528 | 0.5 |
| −15.4902 | 3.626257 | 0.5 |
| −15.7138 | 3.801973 | 0.5 |
| −15.9146 | 3.909745 | 0.5 |
| −16.0861 | 3.941166 | 0.5 |
| −16.2088 | 3.916395 | 0.5 |
| −16.7506 | 3.64984 | 0.6 |
| −16.797 | 3.604843 | 0.6 |
| −16.8533 | 3.52977 | 0.6 |
| −16.9138 | 3.398135 | 0.6 |
| −16.9519 | 3.199867 | 0.6 |
| −16.9452 | 2.936329 | 0.6 |
| −16.8808 | 2.613616 | 0.6 |
| −16.752 | 2.237844 | 0.6 |
| −16.5539 | 1.814909 | 0.6 |
| −16.2809 | 1.351799 | 0.6 |
| −15.927 | 0.857412 | 0.6 |
| −15.486 | 0.343258 | 0.6 |
| −14.9514 | −0.17576 | 0.6 |
| −14.3175 | −0.68052 | 0.6 |
| −13.58 | −1.14686 | 0.6 |
| −12.7384 | −1.54477 | 0.6 |
| −11.7981 | −1.83872 | 0.6 |
| −10.7751 | −1.99026 | 0.6 |
| −9.69655 | −1.96445 | 0.6 |
| −8.6013 | −1.74102 | 0.6 |
| −7.53083 | −1.32059 | 0.6 |
| −6.51654 | −0.72424 | 0.6 |
| −5.57625 | 0.016184 | 0.6 |
| −4.71579 | 0.8676 | 0.6 |
| −3.93394 | 1.800899 | 0.6 |
| −3.22437 | 2.790618 | 0.6 |
| −2.57886 | 3.815678 | 0.6 |
| −1.98895 | 4.858694 | 0.6 |
| −1.44861 | 5.906186 | 0.6 |
| −0.95267 | 6.946666 | 0.6 |
| −0.49425 | 7.96906 | 0.6 |
| −0.06826 | 8.964121 | 0.6 |
| 0.326954 | 9.924834 | 0.6 |
| 0.695157 | 10.8439 | 0.6 |
| 1.03901 | 11.71512 | 0.6 |
| 1.358518 | 12.53393 | 0.6 |
| 1.655657 | 13.29563 | 0.6 |
| 1.929514 | 13.99729 | 0.6 |
| 2.180612 | 14.63614 | 0.6 |
| 2.40836 | 15.2106 | 0.6 |
| 2.612498 | 15.71981 | 0.6 |
| 2.792483 | 16.16388 | 0.6 |
| 2.948155 | 16.54375 | 0.6 |
| 3.079641 | 16.86124 | 0.6 |
| 3.187449 | 17.11912 | 0.6 |
| 3.272525 | 17.32108 | 0.6 |
| 3.317135 | 17.47857 | 0.6 |
| 3.28249 | 17.58742 | 0.6 |
| 3.234185 | 17.641 | 0.6 |
| 3.186653 | 17.66939 | 0.6 |
| 3.140916 | 17.68343 | 0.6 |
| 3.078656 | 17.68591 | 0.6 |
| 2.985561 | 17.65286 | 0.6 |
| 2.896719 | 17.54288 | 0.6 |
| 2.808538 | 17.37529 | 0.6 |
| 2.696107 | 17.16153 | 0.6 |
| 2.558361 | 16.89845 | 0.6 |
| 2.394432 | 16.58384 | 0.6 |
| 2.203861 | 16.21625 | 0.6 |
| 1.986602 | 15.7949 | 0.6 |
| 1.742857 | 15.31977 | 0.6 |
| 1.473049 | 14.79152 | 0.6 |
| 1.177949 | 14.21138 | 0.6 |
| 0.85787 | 13.58152 | 0.6 |
| 0.513494 | 12.90456 | 0.6 |
| 0.145944 | 12.18346 | 0.6 |
| −0.24541 | 11.42265 | 0.6 |
| −0.65978 | 10.62632 | 0.6 |
| −1.0974 | 9.799655 | 0.6 |
| −1.56001 | 8.949089 | 0.6 |
| −2.04768 | 8.080606 | 0.6 |
| −2.56203 | 7.201506 | 0.6 |
| −3.10649 | 6.320718 | 0.6 |
| −3.68376 | 5.447476 | 0.6 |
| −4.29619 | 4.591675 | 0.6 |
| −4.94857 | 3.766244 | 0.6 |
| −5.64647 | 2.987036 | 0.6 |
| −6.39462 | 2.272965 | 0.6 |
| −7.19483 | 1.645787 | 0.6 |
| −8.04574 | 1.132651 | 0.6 |
| −8.93745 | 0.762797 | 0.6 |
| −9.84773 | 0.559223 | 0.6 |
| −10.7413 | 0.526903 | 0.6 |
| −11.5835 | 0.64689 | 0.6 |
| −12.3525 | 0.883569 | 0.6 |
| −13.0379 | 1.198019 | 0.6 |
| −13.6397 | 1.556123 | 0.6 |
| −14.1635 | 1.930672 | 0.6 |
| −14.6171 | 2.300605 | 0.6 |
| −15.0093 | 2.650246 | 0.6 |
| −15.3496 | 2.966446 | 0.6 |
| −15.6452 | 3.241143 | 0.6 |
| −15.9049 | 3.465629 | 0.6 |
| −16.1356 | 3.631864 | 0.6 |
| −16.3411 | 3.730289 | 0.6 |
| −16.514 | 3.753283 | 0.6 |
| −16.6356 | 3.723333 | 0.6 |
| −17.1494 | 3.337239 | 0.7 |
| −17.1945 | 3.29152 | 0.7 |
| −17.2496 | 3.216163 | 0.7 |
| −17.3091 | 3.08489 | 0.7 |
| −17.3451 | 2.887255 | 0.7 |
| −17.3321 | 2.625338 | 0.7 |
| −17.2561 | 2.306892 | 0.7 |
| −17.1107 | 1.93942 | 0.7 |
| −16.8917 | 1.529586 | 0.7 |
| −16.5943 | 1.085148 | 0.7 |
| −16.2126 | 0.615957 | 0.7 |
| −15.7408 | 0.134647 | 0.7 |
| −15.1737 | −0.34264 | 0.7 |

TABLE 1-continued

| X | Y | Zadim |
|---|---|---|
| −14.5067 | −0.79563 | 0.7 |
| −13.7383 | −1.19951 | 0.7 |
| −12.871 | −1.52462 | 0.7 |
| −11.9141 | −1.73752 | 0.7 |
| −10.8882 | −1.80411 | 0.7 |
| −9.81923 | −1.69619 | 0.7 |
| −8.74756 | −1.40067 | 0.7 |
| −7.70787 | −0.92324 | 0.7 |
| −6.72601 | −0.28616 | 0.7 |
| −5.81548 | 0.48091 | 0.7 |
| −4.98004 | 1.348166 | 0.7 |
| −4.21762 | 2.289287 | 0.7 |
| −3.52186 | 3.281087 | 0.7 |
| −2.88558 | 4.304541 | 0.7 |
| −2.30146 | 5.34373 | 0.7 |
| −1.76386 | 6.385803 | 0.7 |
| −1.26806 | 7.419765 | 0.7 |
| −0.80828 | 8.435216 | 0.7 |
| −0.37984 | 9.423158 | 0.7 |
| 0.018674 | 10.37671 | 0.7 |
| 0.39049 | 11.28882 | 0.7 |
| 0.737965 | 12.1534 | 0.7 |
| 1.061004 | 12.96596 | 0.7 |
| 1.361243 | 13.72192 | 0.7 |
| 1.637834 | 14.41834 | 0.7 |
| 1.891252 | 15.05246 | 0.7 |
| 2.12079 | 15.62279 | 0.7 |
| 2.326289 | 16.12839 | 0.7 |
| 2.507254 | 16.5694 | 0.7 |
| 2.663594 | 16.94671 | 0.7 |
| 2.795498 | 17.26212 | 0.7 |
| 2.903545 | 17.51834 | 0.7 |
| 2.988743 | 17.71902 | 0.7 |
| 3.033998 | 17.87542 | 0.7 |
| 2.999669 | 17.98391 | 0.7 |
| 2.951772 | 18.03729 | 0.7 |
| 2.90458 | 18.06569 | 0.7 |
| 2.859174 | 18.07985 | 0.7 |
| 2.797296 | 18.08271 | 0.7 |
| 2.70448 | 18.05088 | 0.7 |
| 2.61517 | 17.94218 | 0.7 |
| 2.52669 | 17.77602 | 0.7 |
| 2.413746 | 17.56415 | 0.7 |
| 2.275287 | 17.30343 | 0.7 |
| 2.110401 | 16.9917 | 0.7 |
| 1.918574 | 16.62753 | 0.7 |
| 1.699691 | 16.21019 | 0.7 |
| 1.453919 | 15.73967 | 0.7 |
| 1.181575 | 15.21669 | 0.7 |
| 0.883431 | 14.64245 | 0.7 |
| 0.559742 | 14.01915 | 0.7 |
| 0.21121 | 13.34938 | 0.7 |
| −0.16108 | 12.63612 | 0.7 |
| −0.55761 | 11.88373 | 0.7 |
| −0.97748 | 11.09631 | 0.7 |
| −1.42084 | 10.27901 | 0.7 |
| −1.88896 | 9.438021 | 0.7 |
| −2.3817 | 8.579204 | 0.7 |
| −2.9004 | 7.709687 | 0.7 |
| −3.44741 | 6.83772 | 0.7 |
| −4.02502 | 5.972158 | 0.7 |
| −4.6351 | 5.122358 | 0.7 |
| −5.28096 | 4.299744 | 0.7 |
| −5.96711 | 3.518441 | 0.7 |
| −6.69776 | 2.795219 | 0.7 |
| −7.47451 | 2.148663 | 0.7 |
| −8.29693 | 1.601697 | 0.7 |
| −9.15887 | 1.17993 | 0.7 |
| −10.044 | 0.905629 | 0.7 |
| −10.9264 | 0.78834 | 0.7 |
| −11.7709 | 0.818088 | 0.7 |
| −12.5565 | 0.96831 | 0.7 |
| −13.2675 | 1.206006 | 0.7 |
| −13.8989 | 1.499446 | 0.7 |
| −14.4522 | 1.821304 | 0.7 |
| −14.9332 | 2.148839 | 0.7 |
| −15.3494 | 2.464401 | 0.7 |
| −15.7096 | 2.753286 | 0.7 |
| −16.0219 | 3.005141 | 0.7 |
| −16.2944 | 3.210427 | 0.7 |
| −16.5347 | 3.359323 | 0.7 |
| −16.7457 | 3.441529 | 0.7 |
| −16.9188 | 3.451361 | 0.7 |
| −17.0376 | 3.414409 | 0.7 |
| −17.522 | 2.908259 | 0.8 |
| −17.5654 | 2.861829 | 0.8 |
| −17.6187 | 2.786363 | 0.8 |
| −17.6763 | 2.655889 | 0.8 |
| −17.7085 | 2.459687 | 0.8 |
| −17.6862 | 2.201182 | 0.8 |
| −17.5939 | 1.890542 | 0.8 |
| −17.4263 | 1.53715 | 0.8 |
| −17.1805 | 1.148552 | 0.8 |
| −16.8521 | 0.733438 | 0.8 |
| −16.4363 | 0.302865 | 0.8 |
| −15.9282 | −0.12912 | 0.8 |
| −15.3238 | −0.54494 | 0.8 |
| −14.6213 | −0.92331 | 0.8 |
| −13.8225 | −1.23953 | 0.8 |
| −12.9341 | −1.46596 | 0.8 |
| −11.9711 | −1.5739 | 0.8 |
| −10.9531 | −1.53661 | 0.8 |
| −9.90953 | −1.33481 | 0.8 |
| −8.87423 | −0.96278 | 0.8 |
| −7.87536 | −0.42971 | 0.8 |
| −6.93252 | 0.243189 | 0.8 |
| −6.05559 | 1.030121 | 0.8 |
| −5.24692 | 1.905489 | 0.8 |
| −4.50409 | 2.846223 | 0.8 |
| −3.82132 | 3.83178 | 0.8 |
| −3.19293 | 4.845438 | 0.8 |
| −2.61295 | 5.87279 | 0.8 |
| −2.07603 | 6.901536 | 0.8 |
| −1.57817 | 7.92131 | 0.8 |
| −1.11489 | 8.922462 | 0.8 |
| −0.68184 | 9.896196 | 0.8 |
| −0.27792 | 10.83584 | 0.8 |
| 0.099455 | 11.73461 | 0.8 |
| 0.452357 | 12.58655 | 0.8 |
| 0.780517 | 13.38728 | 0.8 |
| 1.085253 | 14.13234 | 0.8 |
| 1.365821 | 14.81879 | 0.8 |
| 1.622555 | 15.44395 | 0.8 |
| 1.854714 | 16.00633 | 0.8 |
| 2.062237 | 16.50499 | 0.8 |
| 2.244699 | 16.94004 | 0.8 |
| 2.402101 | 17.31232 | 0.8 |
| 2.534716 | 17.62358 | 0.8 |
| 2.643216 | 17.87647 | 0.8 |
| 2.728688 | 18.07462 | 0.8 |
| 2.77426 | 18.22912 | 0.8 |
| 2.740649 | 18.33672 | 0.8 |
| 2.693602 | 18.38981 | 0.8 |
| 2.647141 | 18.41832 | 0.8 |
| 2.602338 | 18.43281 | 0.8 |
| 2.541115 | 18.43642 | 0.8 |
| 2.448738 | 18.40657 | 0.8 |
| 2.35838 | 18.30045 | 0.8 |
| 2.269364 | 18.13672 | 0.8 |
| 2.155694 | 17.92796 | 0.8 |
| 2.016233 | 17.67114 | 0.8 |
| 1.850011 | 17.36413 | 0.8 |
| 1.656427 | 17.00556 | 0.8 |
| 1.435275 | 16.59476 | 0.8 |
| 1.18666 | 16.13176 | 0.8 |
| 0.910777 | 15.61731 | 0.8 |
| 0.608305 | 15.05268 | 0.8 |
| 0.279522 | 14.44001 | 0.8 |
| −0.07497 | 13.78195 | 0.8 |
| −0.45409 | 13.08143 | 0.8 |
| −0.85825 | 12.34279 | 0.8 |
| −1.28638 | 11.57002 | 0.8 |
| −1.73859 | 10.76824 | 0.8 |
| −2.21563 | 9.943392 | 0.8 |
| −2.71708 | 9.101137 | 0.8 |
| −3.24405 | 8.248494 | 0.8 |

TABLE 1-continued

| X | Y | Zadim |
|---|---|---|
| −3.79771 | 7.392973 | 0.8 |
| −4.37964 | 6.542891 | 0.8 |
| −4.99127 | 5.707139 | 0.8 |
| −5.63428 | 4.895597 | 0.8 |
| −6.31173 | 4.120479 | 0.8 |
| −7.02682 | 3.396212 | 0.8 |
| −7.78043 | 2.738025 | 0.8 |
| −8.57226 | 2.164183 | 0.8 |
| −9.39867 | 1.695467 | 0.8 |
| −10.2489 | 1.351007 | 0.8 |
| −11.1038 | 1.141851 | 0.8 |
| −11.9389 | 1.065576 | 0.8 |
| −12.7283 | 1.106618 | 0.8 |
| −13.4583 | 1.241812 | 0.8 |
| −14.1168 | 1.44532 | 0.8 |
| −14.7007 | 1.691741 | 0.8 |
| −15.212 | 1.957289 | 0.8 |
| −15.6561 | 2.222112 | 0.8 |
| −16.0403 | 2.469839 | 0.8 |
| −16.3728 | 2.687101 | 0.8 |
| −16.6611 | 2.863082 | 0.8 |
| −16.9125 | 2.985708 | 0.8 |
| −17.1291 | 3.043855 | 0.8 |
| −17.3005 | 3.03543 | 0.8 |
| −17.4149 | 2.989688 | 0.8 |
| −17.8685 | 2.362904 | 0.8 |
| −17.9097 | 2.315698 | 0.9 |
| −17.9607 | 2.240147 | 0.9 |
| −18.0155 | 2.11062 | 0.9 |
| −18.0422 | 1.916343 | 0.9 |
| −18.0069 | 1.662919 | 0.9 |
| −17.8938 | 1.363976 | 0.9 |
| −17.6988 | 1.031158 | 0.9 |
| −17.4207 | 0.672906 | 0.9 |
| −17.0565 | 0.298916 | 0.9 |
| −16.6025 | −0.07839 | 0.9 |
| −16.0553 | −0.44343 | 0.9 |
| −15.4134 | −0.77728 | 0.9 |
| −14.6783 | −1.05826 | 0.9 |
| −13.8561 | −1.26313 | 0.9 |
| −12.9588 | −1.3684 | 0.9 |
| −12.0025 | −1.35278 | 0.9 |
| −11.0091 | −1.19917 | 0.9 |
| −10.0058 | −0.89806 | 0.9 |
| −9.01765 | −0.45006 | 0.9 |
| −8.06597 | 0.134164 | 0.9 |
| −7.16477 | 0.836394 | 0.9 |
| −6.32143 | 1.63597 | 0.9 |
| −5.53784 | 2.512069 | 0.9 |
| −4.81185 | 3.445112 | 0.9 |
| −4.13872 | 4.417333 | 0.9 |
| −3.51472 | 5.414431 | 0.9 |
| −2.9354 | 6.423516 | 0.9 |
| −2.39556 | 7.432686 | 0.9 |
| −1.8921 | 8.432281 | 0.9 |
| −1.42203 | 9.413486 | 0.9 |
| −0.98119 | 10.36762 | 0.9 |
| −0.56889 | 11.28823 | 0.9 |
| −0.18323 | 12.16887 | 0.9 |
| 0.177612 | 13.0037 | 0.9 |
| 0.513115 | 13.78847 | 0.9 |
| 0.824319 | 14.51884 | 0.9 |
| 1.110625 | 15.19186 | 0.9 |
| 1.372154 | 15.80494 | 0.9 |
| 1.608196 | 16.35662 | 0.9 |
| 1.818784 | 16.84593 | 0.9 |
| 2.003603 | 17.27293 | 0.9 |
| 2.162758 | 17.63841 | 0.9 |
| 2.296627 | 17.94407 | 0.9 |
| 2.406 | 18.19246 | 0.9 |
| 2.492059 | 18.3871 | 0.9 |
| 2.537856 | 18.53923 | 0.9 |
| 2.505569 | 18.64564 | 0.9 |
| 2.459761 | 18.69851 | 0.9 |
| 2.414335 | 18.72726 | 0.9 |
| 2.370282 | 18.74232 | 0.9 |
| 2.309827 | 18.74704 | 0.9 |
| 2.217867 | 18.7196 | 0.9 |
| 2.125915 | 18.61694 | 0.9 |
| 2.035878 | 18.45617 | 0.9 |
| 1.920945 | 18.25118 | 0.9 |
| 1.779799 | 17.99906 | 0.9 |
| 1.611379 | 17.69776 | 0.9 |
| 1.414993 | 17.34598 | 0.9 |
| 1.190306 | 16.94313 | 0.9 |
| 0.937321 | 16.48929 | 0.9 |
| 0.656086 | 15.98529 | 0.9 |
| 0.34718 | 15.43242 | 0.9 |
| 0.010867 | 14.83285 | 0.9 |
| −0.35238 | 14.18925 | 0.9 |
| −0.74155 | 13.5046 | 0.9 |
| −1.15697 | 12.78319 | 0.9 |
| −1.5974 | 12.0289 | 0.9 |
| −2.06296 | 11.24688 | 0.9 |
| −2.55387 | 10.44279 | 0.9 |
| −3.06931 | 9.62207 | 0.9 |
| −3.6103 | 8.791736 | 0.9 |
| −4.17668 | 7.958461 | 0.9 |
| −4.76914 | 7.129952 | 0.9 |
| −5.38872 | 6.314709 | 0.9 |
| −6.03531 | 5.52102 | 0.9 |
| −6.71026 | 4.759161 | 0.9 |
| −7.41533 | 4.041099 | 0.9 |
| −8.15008 | 3.378583 | 0.9 |
| −8.91355 | 2.785196 | 0.9 |
| −9.70315 | 2.276275 | 0.9 |
| −10.5121 | 1.866206 | 0.9 |
| −11.3281 | 1.564939 | 0.9 |
| −12.1344 | 1.375335 | 0.9 |
| −12.9134 | 1.29271 | 0.9 |
| −13.6464 | 1.305899 | 0.9 |
| −14.3215 | 1.397913 | 0.9 |
| −14.9299 | 1.547696 | 0.9 |
| −15.469 | 1.731807 | 0.9 |
| −15.9408 | 1.928602 | 0.9 |
| −16.3502 | 2.12025 | 0.9 |
| −16.7042 | 2.290118 | 0.9 |
| −17.0095 | 2.425563 | 0.9 |
| −17.2723 | 2.511813 | 0.9 |
| −17.4926 | 2.537261 | 0.9 |
| −17.6592 | 2.50552 | 0.9 |
| −17.7673 | 2.449311 | 0.9 |
| −18.1889 | 1.701256 | 1 |
| −18.2276 | 1.653102 | 1 |
| −18.2757 | 1.577296 | 1 |
| −18.3269 | 1.448468 | 1 |
| −18.3459 | 1.256271 | 1 |
| −18.2936 | 1.009479 | 1 |
| −18.1549 | 0.726805 | 1 |
| −17.928 | 0.421881 | 1 |
| −17.6141 | 0.103914 | 1 |
| −17.2117 | −0.21654 | 1 |
| −16.719 | −0.5258 | 1 |
| −16.1351 | −0.80709 | 1 |
| −15.4616 | −1.0408 | 1 |
| −14.704 | −1.20599 | 1 |
| −13.8729 | −1.2825 | 1 |
| −12.9826 | −1.25263 | 1 |
| −12.0518 | −1.10371 | 1 |
| −11.1011 | −0.82853 | 1 |
| −10.1503 | −0.42684 | 1 |
| −9.21742 | 0.095428 | 1 |
| −8.31634 | 0.727159 | 1 |
| −7.45631 | 1.453807 | 1 |
| −6.6434 | 2.260489 | 1 |
| −5.88014 | 3.13173 | 1 |
| −5.16547 | 4.051739 | 1 |
| −4.49604 | 5.00549 | 1 |
| −3.87037 | 5.981182 | 1 |
| −3.28606 | 6.967656 | 1 |
| −2.73784 | 7.953184 | 1 |
| −2.22342 | 8.928712 | 1 |
| −1.74169 | 9.886454 | 1 |
| −1.28851 | 10.81771 | 1 |
| −0.8635 | 11.71622 | 1 |
| −0.46567 | 12.57595 | 1 |

TABLE 1-continued

| X | Y | Zadim |
|---|---|---|
| −0.0933 | 13.3911 | 1 |
| 0.252769 | 14.15757 | 1 |
| 0.573301 | 14.87118 | 1 |
| 0.867908 | 15.5289 | 1 |
| 1.136474 | 16.12825 | 1 |
| 1.378332 | 16.6678 | 1 |
| 1.593617 | 17.14652 | 1 |
| 1.782162 | 17.56442 | 1 |
| 1.944207 | 17.92224 | 1 |
| 2.080241 | 18.22158 | 1 |
| 2.191211 | 18.4649 | 1 |
| 2.278413 | 18.6556 | 1 |
| 2.324689 | 18.8052 | 1 |
| 2.29458 | 18.91037 | 1 |
| 2.250337 | 18.96329 | 1 |
| 2.206162 | 18.99252 | 1 |
| 2.162852 | 19.00843 | 1 |
| 2.103076 | 19.01457 | 1 |
| 2.0112 | 18.98963 | 1 |
| 1.917183 | 18.89077 | 1 |
| 1.825293 | 18.73296 | 1 |
| 1.708106 | 18.53168 | 1 |
| 1.564022 | 18.2842 | 1 |
| 1.391876 | 17.98857 | 1 |
| 1.190843 | 17.64359 | 1 |
| 0.960429 | 17.24875 | 1 |
| 0.700521 | 16.8042 | 1 |
| 0.410971 | 16.3109 | 1 |
| 0.092234 | 15.7702 | 1 |
| −0.2555 | 15.1843 | 1 |
| −0.63188 | 14.55598 | 1 |
| −1.036 | 13.88826 | 1 |
| −1.46815 | 13.18545 | 1 |
| −1.92688 | 12.45133 | 1 |
| −2.41245 | 11.6912 | 1 |
| −2.92437 | 10.91036 | 1 |
| −3.46149 | 10.11408 | 1 |
| −4.02482 | 9.309509 | 1 |
| −4.61249 | 8.502206 | 1 |
| −5.22454 | 7.699445 | 1 |
| −5.86135 | 6.90928 | 1 |
| −6.5206 | 6.138033 | 1 |
| −7.20199 | 5.394145 | 1 |
| −7.9051 | 4.6867 | 1 |
| −8.62738 | 4.023471 | 1 |
| −9.36639 | 3.413188 | 1 |
| −10.1195 | 2.865595 | 1 |
| −10.8825 | 2.390364 | 1 |
| −11.6494 | 1.996738 | 1 |
| −12.4119 | 1.692767 | 1 |
| −13.1589 | 1.483554 | 1 |
| −13.8768 | 1.368521 | 1 |
| −14.5515 | 1.339107 | 1 |
| −15.171 | 1.379366 | 1 |
| −15.7286 | 1.467629 | 1 |
| −16.2221 | 1.581982 | 1 |
| −16.6533 | 1.703509 | 1 |
| −17.0266 | 1.813483 | 1 |
| −17.3469 | 1.897052 | 1 |
| −17.6183 | 1.936283 | 1 |
| −17.8374 | 1.920737 | 1 |
| −17.995 | 1.861716 | 1 |
| −18.0946 | 1.793589 | 1 |
| −18.2519 | 1.555058 | 1.020435 |
| −18.29 | 1.506681 | 1.020435 |
| −18.3376 | 1.43078 | 1.020435 |
| −18.388 | 1.302027 | 1.020435 |
| −18.405 | 1.110213 | 1.020435 |
| −18.3488 | 0.864943 | 1.020435 |
| −18.2045 | 0.586115 | 1.020435 |
| −17.9708 | 0.28768 | 1.020435 |
| −17.6495 | −0.02105 | 1.020435 |
| −17.2395 | −0.32939 | 1.020435 |
| −16.7395 | −0.62347 | 1.020435 |
| −16.149 | −0.88634 | 1.020435 |
| −15.4704 | −1.09843 | 1.020435 |
| −14.7101 | −1.23908 | 1.020435 |
| −13.879 | −1.28891 | 1.020435 |
| −12.9927 | −1.23142 | 1.020435 |
| −12.0694 | −1.05555 | 1.020435 |
| −11.1288 | −0.75589 | 1.020435 |
| −10.19 | −0.33384 | 1.020435 |
| −9.26907 | 0.203585 | 1.020435 |
| −8.37855 | 0.845063 | 1.020435 |
| −7.52671 | 1.57664 | 1.020435 |
| −6.71941 | 2.384573 | 1.020435 |
| −5.95948 | 3.254574 | 1.020435 |
| −5.24624 | 4.171683 | 1.020435 |
| −4.57661 | 5.121423 | 1.020435 |
| −3.9496 | 6.092504 | 1.020435 |
| −3.36335 | 7.074193 | 1.020435 |
| −2.81258 | 8.054772 | 1.020435 |
| −2.29508 | 9.025263 | 1.020435 |
| −1.81021 | 9.978138 | 1.020435 |
| −1.3538 | 10.90467 | 1.020435 |
| −0.92554 | 11.79862 | 1.020435 |
| −0.52462 | 12.65407 | 1.020435 |
| −0.14935 | 13.46519 | 1.020435 |
| 0.199383 | 14.22793 | 1.020435 |
| 0.522269 | 14.93814 | 1.020435 |
| 0.818967 | 15.59275 | 1.020435 |
| 1.089323 | 16.18933 | 1.020435 |
| 1.332679 | 16.72643 | 1.020435 |
| 1.549184 | 17.20304 | 1.020435 |
| 1.738715 | 17.61912 | 1.020435 |
| 1.901533 | 17.9754 | 1.020435 |
| 2.038162 | 18.27349 | 1.020435 |
| 2.149579 | 18.5158 | 1.020435 |
| 2.237107 | 18.70572 | 1.020435 |
| 2.283556 | 18.85484 | 1.020435 |
| 2.254015 | 18.95978 | 1.020435 |
| 2.210118 | 19.01276 | 1.020435 |
| 2.166206 | 19.04214 | 1.020435 |
| 2.12303 | 19.05825 | 1.020435 |
| 2.063358 | 19.06472 | 1.020435 |
| 1.97142 | 19.04027 | 1.020435 |
| 1.876943 | 18.94215 | 1.020435 |
| 1.784536 | 18.78487 | 1.020435 |
| 1.666723 | 18.58424 | 1.020435 |
| 1.521832 | 18.3376 | 1.020435 |
| 1.34867 | 18.043 | 1.020435 |
| 1.146382 | 17.69925 | 1.020435 |
| 0.914444 | 17.30589 | 1.020435 |
| 0.652706 | 16.86307 | 1.020435 |
| 0.360977 | 16.37178 | 1.020435 |
| 0.039687 | 15.83339 | 1.020435 |
| −0.31099 | 15.25012 | 1.020435 |
| −0.69074 | 14.62477 | 1.020435 |
| −1.09869 | 13.96037 | 1.020435 |
| −1.5351 | 13.26126 | 1.020435 |
| −1.99849 | 12.53119 | 1.020435 |
| −2.48916 | 11.77552 | 1.020435 |
| −3.00644 | 10.99944 | 1.020435 |
| −3.54916 | 10.20824 | 1.020435 |
| −4.11829 | 9.409075 | 1.020435 |
| −4.71155 | 8.607225 | 1.020435 |
| −5.32892 | 7.809941 | 1.020435 |
| −5.97058 | 7.025136 | 1.020435 |
| −6.63367 | 6.258638 | 1.020435 |
| −7.31755 | 5.518534 | 1.020435 |
| −8.02125 | 4.813194 | 1.020435 |
| −8.74162 | 4.149455 | 1.020435 |
| −9.47583 | 3.534992 | 1.020435 |
| −10.2211 | 2.978479 | 1.020435 |
| −10.9739 | 2.488961 | 1.020435 |
| −11.7297 | 2.076104 | 1.020435 |
| −12.4818 | 1.749333 | 1.020435 |
| −13.2206 | 1.515484 | 1.020435 |
| −13.9332 | 1.375515 | 1.020435 |
| −14.6054 | 1.322091 | 1.020435 |
| −15.2254 | 1.340097 | 1.020435 |
| −15.7851 | 1.408315 | 1.020435 |
| −16.2818 | 1.505079 | 1.020435 |
| −16.7165 | 1.611215 | 1.020435 |
| −17.0931 | 1.707946 | 1.020435 |
| −17.4159 | 1.779955 | 1.020435 |

TABLE 1-continued

| X | Y | Zadim |
|---|---|---|
| −17.6882 | 1.808618 | 1.020435 |
| −17.9064 | 1.784099 | 1.020435 |
| −18.0614 | 1.719368 | 1.020435 |
| −18.1591 | 1.648713 | 1.020435 |
| −18.3149 | 1.408912 | 1.040863 |
| −18.3525 | 1.360299 | 1.040863 |
| −18.3995 | 1.284282 | 1.040863 |
| −18.449 | 1.155565 | 1.040863 |
| −18.4641 | 0.964084 | 1.040863 |
| −18.404 | 0.720339 | 1.040863 |
| −18.2539 | 0.445418 | 1.040863 |
| −18.0136 | 0.153545 | 1.040863 |
| −17.685 | −0.14589 | 1.040863 |
| −17.2678 | −0.4421 | 1.040863 |
| −16.7607 | −0.72104 | 1.040863 |
| −16.1642 | −0.96567 | 1.040863 |
| −15.4811 | −1.15646 | 1.040863 |
| −14.7186 | −1.27312 | 1.040863 |
| −13.8883 | −1.29703 | 1.040863 |
| −13.0065 | −1.21282 | 1.040863 |
| −12.0908 | −1.01091 | 1.040863 |
| −11.1607 | −0.6875 | 1.040863 |
| −10.2338 | −0.24553 | 1.040863 |
| −9.3248 | 0.306937 | 1.040863 |
| −8.44473 | 0.958257 | 1.040863 |
| −7.60089 | 1.694945 | 1.040863 |
| −6.79894 | 2.504315 | 1.040863 |
| −6.04206 | 3.373271 | 1.040863 |
| −5.32994 | 4.287698 | 1.040863 |
| −4.65983 | 5.233648 | 1.040863 |
| −4.03117 | 6.200328 | 1.040863 |
| −3.44273 | 7.177469 | 1.040863 |
| −2.88918 | 8.15335 | 1.040863 |
| −2.36838 | 9.119045 | 1.040863 |
| −1.88017 | 10.06729 | 1.040863 |
| −1.42037 | 10.98934 | 1.040863 |
| −0.98869 | 11.87898 | 1.040863 |
| −0.58454 | 12.73036 | 1.040863 |
| −0.20623 | 13.53767 | 1.040863 |
| 0.145282 | 14.2969 | 1.040863 |
| 0.470633 | 15.00389 | 1.040863 |
| 0.769523 | 15.65559 | 1.040863 |
| 1.041758 | 16.24957 | 1.040863 |
| 1.286692 | 16.78438 | 1.040863 |
| 1.504492 | 17.25899 | 1.040863 |
| 1.695069 | 17.67337 | 1.040863 |
| 1.858719 | 18.02823 | 1.040863 |
| 1.995986 | 18.32515 | 1.040863 |
| 2.107882 | 18.56652 | 1.040863 |
| 2.195765 | 18.75571 | 1.040863 |
| 2.24243 | 18.90438 | 1.040863 |
| 2.213485 | 19.00914 | 1.040863 |
| 2.169927 | 19.06221 | 1.040863 |
| 2.126271 | 19.09173 | 1.040863 |
| 2.083206 | 19.10807 | 1.040863 |
| 2.023616 | 19.11485 | 1.040863 |
| 1.931581 | 19.09085 | 1.040863 |
| 1.836654 | 18.9934 | 1.040863 |
| 1.74369 | 18.83659 | 1.040863 |
| 1.625198 | 18.63655 | 1.040863 |
| 1.479436 | 18.39065 | 1.040863 |
| 1.30518 | 18.09696 | 1.040863 |
| 1.101547 | 17.75432 | 1.040863 |
| 0.867978 | 17.36229 | 1.040863 |
| 0.604286 | 16.92103 | 1.040863 |
| 0.310246 | 16.43158 | 1.040863 |
| −0.01375 | 15.8953 | 1.040863 |
| −0.36754 | 15.31446 | 1.040863 |
| −0.75084 | 14.69186 | 1.040863 |
| −1.16281 | 14.03057 | 1.040863 |
| −1.6037 | 13.33494 | 1.040863 |
| −2.07199 | 12.6087 | 1.040863 |
| −2.56801 | 11.85726 | 1.040863 |
| −3.09091 | 11.08572 | 1.040863 |
| −3.63952 | 10.29939 | 1.040863 |
| −4.21474 | 9.505411 | 1.040863 |
| −4.81389 | 8.708795 | 1.040863 |
| −5.43692 | 7.916791 | 1.040863 |
| −6.08375 | 7.137132 | 1.040863 |
| −6.75097 | 6.375146 | 1.040863 |
| −7.43764 | 5.638551 | 1.040863 |
| −8.14214 | 4.934963 | 1.040863 |
| −8.86072 | 4.270263 | 1.040863 |
| −9.59009 | 3.651069 | 1.040863 |
| −10.3274 | 3.085073 | 1.040863 |
| −11.0698 | 2.580946 | 1.040863 |
| −11.8142 | 2.149035 | 1.040863 |
| −12.5558 | 1.800202 | 1.040863 |
| −13.2862 | 1.542837 | 1.040863 |
| −13.9933 | 1.379145 | 1.040863 |
| −14.6628 | 1.302796 | 1.040863 |
| −15.2825 | 1.299383 | 1.040863 |
| −15.8439 | 1.348115 | 1.040863 |
| −16.3433 | 1.42767 | 1.040863 |
| −16.7811 | 1.518585 | 1.040863 |
| −17.1605 | 1.602158 | 1.040863 |
| −17.4854 | 1.662647 | 1.040863 |
| −17.7585 | 1.680758 | 1.040863 |
| −17.9754 | 1.647372 | 1.040863 |
| −18.1278 | 1.577063 | 1.040863 |
| −18.2236 | 1.503916 | 1.040863 |
| −18.2793 | 1.4492 | 1.040863 |

In the above Table 1, the plane Zadim=0 corresponds to the reference plane P0 situated at the base of the profile. This plane P0 is the intersection of the stacking axis AE of the set of vanes with the axisymmetric surface of the hub, i.e. it passes via the intersection between the axis AE and the surface 16A where it is assembled with the inner shroud 16. The plane Zadim=1 corresponds to the reference plane P1 situated at the top of the profile. This plane P1 is the intersection between the axis AE and the axisymmetric surface of the casing, i.e. it passes via the intersection of the axis AE with the surface 12A where it is assembled with the outer ring 12.

By convention, the stacking axis AE of the set of vanes, for the vane of a nozzle, is the axis that extends in the radial direction Z and passes through the middle of the inter-vane throat. For a given vane, the inter-vane throat is the location where the distance between the trailing edge of the vane in question and the suction side of the preceding vane in the direction of rotation of the turbine is at a minimum.

This is the axis on which the various X,Y sections of the set of vanes are "stacked" when designing the set of vanes.

As mentioned at the beginning of the present description, the aerodynamic profile of the invention is substantially identical to the nominal profile defined in the above table, i.e. it departs from said nominal profile by very little at most, being defined in particular within an envelope of ±1 mm in a direction normal to the surface of the nominal profile, and/or having X,Y coordinates lying within a range of ±5% relative to the coordinates X,Y of the nominal profile.

The coordinate Zadim is non-dimensional, i.e. for a point P, situated at a distance D from the plane P0 (where D is measured along the axis Z), the value of Zadim is D/H, where H represents the total height of the profile as measured between the planes P0 and P1. Naturally, in the Table 1 above, by multiplying the coordinate Zadim by the height H, it is possible to obtain the complete coordinates of the vane.

By way of example, the total height H is preferably about 130 mm±10%. By way of example, the plane P0 is situated at a distance of about 395 mm±10% from the axis A.

In the above table, the profile is characterized by fifteen section planes at constant Zadim coordinates, for which the coordinates X and Y are specified. These fifteen section planes include eleven section planes located between Zadim=0 and Zadim=1, and thus arranged in the fluid stream, these section planes being distributed from P0 to P1. The fifteen section planes also include four section planes which are substantially outside the fluid stream (two section planes with Zadim<0, and two section planes with Zadim>1), these four section planes being provided for ensuring geometric continuity of the stacking, close to the head and the foot, respectively. In each section plane at constant coordinate Zadim, the section of the profile is given by a continuous and smooth curve, interconnecting all of the points (X,Y). In each section plane, the profile is interpolated so as to generate a uniform profile. Between the section planes, the profile is to be interpolated so as to generate a complete vane, as homogeneous as possible.

It is advantageous for the nozzle that includes the vane of the invention to have 140 to 160 vanes that present aerodynamic profiles as defined above.

We claim:

1. An aerodynamic profile for a turbine vane, the aerodynamic profile defining the turbine vane when cold and in a non-coated state, the aerodynamic profile being substantially identical to a nominal profile determined by Cartesian coordinates X,Y,Zadim given in Table 1, in which the coordinate Zadim is a quotient D/H, where D is a distance of a point under consideration from a reference X,Y plane situated at a base of the nominal profile, and H is a height of said profile measured from said reference plane out to an end of the turbine vane, the measurements D and H being taken radially relative to an axial direction of a turbine, while the coordinate X is measured in the axial direction of the turbine.

2. The aerodynamic profile as claimed in claim 1, wherein said profile is defined within an envelope of ±1 mm in a direction normal to the surface of the nominal profile.

3. The aerodynamic profile as claimed in claim 1, wherein the coordinates X,Y of said profile lie within a range of ±5% relative to the coordinates X,Y of the nominal profile.

4. The aerodynamic profile as claimed in claim 1, wherein the turbine vane is a nozzle vane forming a part of a stator of the turbine.

5. The aerodynamic profile as claimed in claim 4, wherein the turbine vane is a nozzle vane of a fifth stage of the turbine.

6. The aerodynamic profile as claimed in claim 4, wherein the turbine vane is a vane of a fifth stage nozzle of the turbine, wherein the turbine includes seven stages.

7. A turbine vane, presenting an aerodynamic profile as claimed in claim 1.

8. A turbine, including a plurality of turbine vanes presenting aerodynamic profiles as claimed in claim 1.

9. A turbine as claimed in claim 8, including a nozzle that is stationary in rotation, having 140 to 160 vanes that each present the aerodynamic profile.

10. A turbine nozzle forming a portion of a turbine stator, wherein all the turbine vanes of the nozzle present an aerodynamic profile as claimed in claim 1.

11. A turbine nozzle as claimed in claim 10, including 140 to 160 vanes that each present the aerodynamic profile.

* * * * *